United States Patent [19]

Owashi

[11] Patent Number: 5,640,612
[45] Date of Patent: Jun. 17, 1997

[54] VARIABLE TIME LAG CAMERA

[75] Inventor: Masao Owashi, Kawasaki, Japan

[73] Assignee: Nikon Corporation, Tokyo, Japan

[21] Appl. No.: 542,805

[22] Filed: Oct. 13, 1995

Related U.S. Application Data

[63] Continuation of Ser. No. 221,930, Apr. 1, 1994, abandoned.

[30] Foreign Application Priority Data

May 15, 1993 [JP] Japan ................... 5-136738

[51] Int. Cl.$^6$ .................. G03B 39/00; G03B 7/08
[52] U.S. Cl. ............................. 396/55; 396/472
[58] Field of Search ................. 354/237, 238.1, 354/256, 267.1; 396/55, 472

[56] References Cited

U.S. PATENT DOCUMENTS

| | | | |
|---|---|---|---|
| 2,880,798 | 4/1959 | Lohmeyer, Jr. | 354/237 |
| 3,665,833 | 5/1972 | Müller | 95/53.3 |
| 3,667,367 | 6/1972 | Miyagawa | 95/53.3 |
| 3,984,848 | 10/1976 | Akiyama et al. | 354/51 |
| 4,152,058 | 5/1979 | Numata et al. | 354/152 |
| 4,268,154 | 5/1981 | Daitoku | 354/238 |
| 4,295,724 | 10/1981 | Sahara et al. | 354/238 |
| 4,307,953 | 12/1981 | Yamamoto et al. | 354/238 |
| 4,374,615 | 2/1983 | Nagaoka et al. | 354/238 |
| 4,969,003 | 11/1990 | Ohnuki et al. | 354/402 |
| 5,092,673 | 3/1992 | Hayashi | 354/152 |
| 5,181,060 | 1/1993 | Kobayashi et al. | 354/238.1 |
| 5,345,288 | 9/1994 | Kobayashi et al. | 354/238.1 |

FOREIGN PATENT DOCUMENTS 2910258  9/1979  Germany .

*Primary Examiner*—Safet Metjahic
*Assistant Examiner*—Nicholas J. Tuccillo
*Attorney, Agent, or Firm*—Oliff & Berridge

[57] ABSTRACT

A variable time lag camera includes a release signal generation mechanism that generates a release signal, for example, after a user presses a release button, a shutter mechanism for limiting the time of exposure of a recording medium, and a time lag adjusting mechanism that sets the time lag between the generation of the release signal and the starting of the shutter mechanism from a plurality of available release time lags. Additionally, when in a single frame mode, the time lag corresponds to a time lag selected by the camera user. When in a continuous photography mode, the camera automatically selects the shortest possible time lag so that plural photographs can be taken at the highest possible rate.

40 Claims, 3 Drawing Sheets

VARIABLE TIME LAG CAMERA

This is a Continuation of application Ser. No. 08/221,930 filed Apr. 1, 1994, now abandoned.

BACKGROUND OF THE INVENTION

1. Field of the Invention

The present invention relates to a variable time lag camera in which the release time lag (i.e., the time between the output of a release signal and the time that the camera shutter begins moving) can be set.

2. Description of Related Art

In single-lens reflex cameras, the camera can shake due to vibrations caused by such things as the movement of the mirror when the mirror is moved upward and by the jolt associated with the mirror movement. Accordingly, in conventional single-lens reflex cameras, a release time lag exists between the output of the release signal (generated, for example, when the camera user presses a release button downward) and the start of movement of the front shutter curtain. This release time is provided to allow for the mirror movement or for autofocusing of the lens prior to film exposure. Because of this release time lag, the front shutter curtain does not start moving until several tens of milliseconds have elapsed after generation of the release signal.

When a camera is operated in continuous photography mode, in which several frames (i.e., photographs) are taken continuously (i.e., several photographs are taken sequentially for a single actuation of the release button), it is desirable to have a short release time lag for each frame. This will enable the time between each photograph to be short, and will make full use of the high speed frame (film) advance capabilities of the camera.

However, in single-lens reflex cameras, the camera can shake due to vibrations caused by such things as movement of the mirror as detailed above. Consequently, problems such as multiple exposures or blurring may result if some minimum time lag is not used for each frame.

Thus, from the standpoint of camera movement, a long release time lag is desirable because it allows time for stabilizing the camera movement. Because, as explained above, a short release time lag is desired for the continuous photography mode, the length of the release time lag must be reset (i.e., shortened) or the speed of the frame advance will drop.

U.S. Pat. No. 4,969,003 discloses a single-reflex camera including an autofocus device. Time lag associated with typical single-reflex cameras is discussed on column 1, lines 32–47 and column 7, lines 30–53. A release subroutine that is used for single frame mode is detailed on column 17, line 52—column 18, line 35, and differs from a release subroutine used for continuous photography mode, as detailed on column 18, line 60—column 19, line 46. In particular, the values of variables used in an autofocus procedure are not reset between frames when the camera operates in the continuous photography mode so that the frame rate (i.e., the rate at which photographs are taken) can be maintained at a high level.

SUMMARY OF THE INVENTION

It is an object of the invention to solve the above problems and to prevent negative effects from camera shaking while also automatically utilizing the high speed of frame advance during operation of the camera in the continuous photography mode.

In order to overcome the above and other objects, and to overcome the shortcomings in previous devices, the present invention provides a variable time lag camera that provides a time lag selecting mechanism enabling a user of the camera to select between a plurality of time lags. The camera also can automatically select the minimum time lag when the camera is in the continuous photography mode. In accordance with the invention, the variable time lag camera includes a release signal generation mechanism that generates a release signal, a shutter mechanism that limits the time of exposure of a recording medium, and a time lag adjusting mechanism that selectively sets the time lag between the generation of the release signal and the initiation of movement of the shutter mechanism from a plurality of available time lags.

The camera further includes a film advancing mechanism that advances film by either a single-frame mode or by a continuous photography mode, and an advance mode selection mechanism for selecting the advance mode of the film advancing mechanism. The time lag adjusting mechanism sets the time lag so that the time lag between the generation of the release signal and initiation of movement of the shutter mechanism is minimized when the continuous photography mode is selected with the advance mode selection mechanism.

Because the variable time lag camera is constructed with a time lag adjusting mechanism that selectively sets the time lag between the generation of the release signal and the starting of the shutter mechanism from a plurality of available time lags having predetermined or arbitrary values, the shutter mechanism can be started after the camera has stabilized by setting the value of the time lag to correspond to the time required for vibrations from mirror movement to settle. In this manner, the problems caused by camera movement can be prevented.

Further, when the continuous photography mode is selected, the time lag adjusting mechanism automatically sets the time lag between the generation of the release signal and the starting of the shutter mechanism to a minimal time lag. Thus, it is unnecessary to reset the value of the release time lag every time continuous photography is performed. Moreover, at the completion of the continuous photography mode, the length of the previously selected release time lag is restored automatically. Consequently, the photographer is not burdened with having to reset the release time lag every time continuous photography is performed.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

An embodiment of the invention is explained below with reference to the figures.

Figure 1:
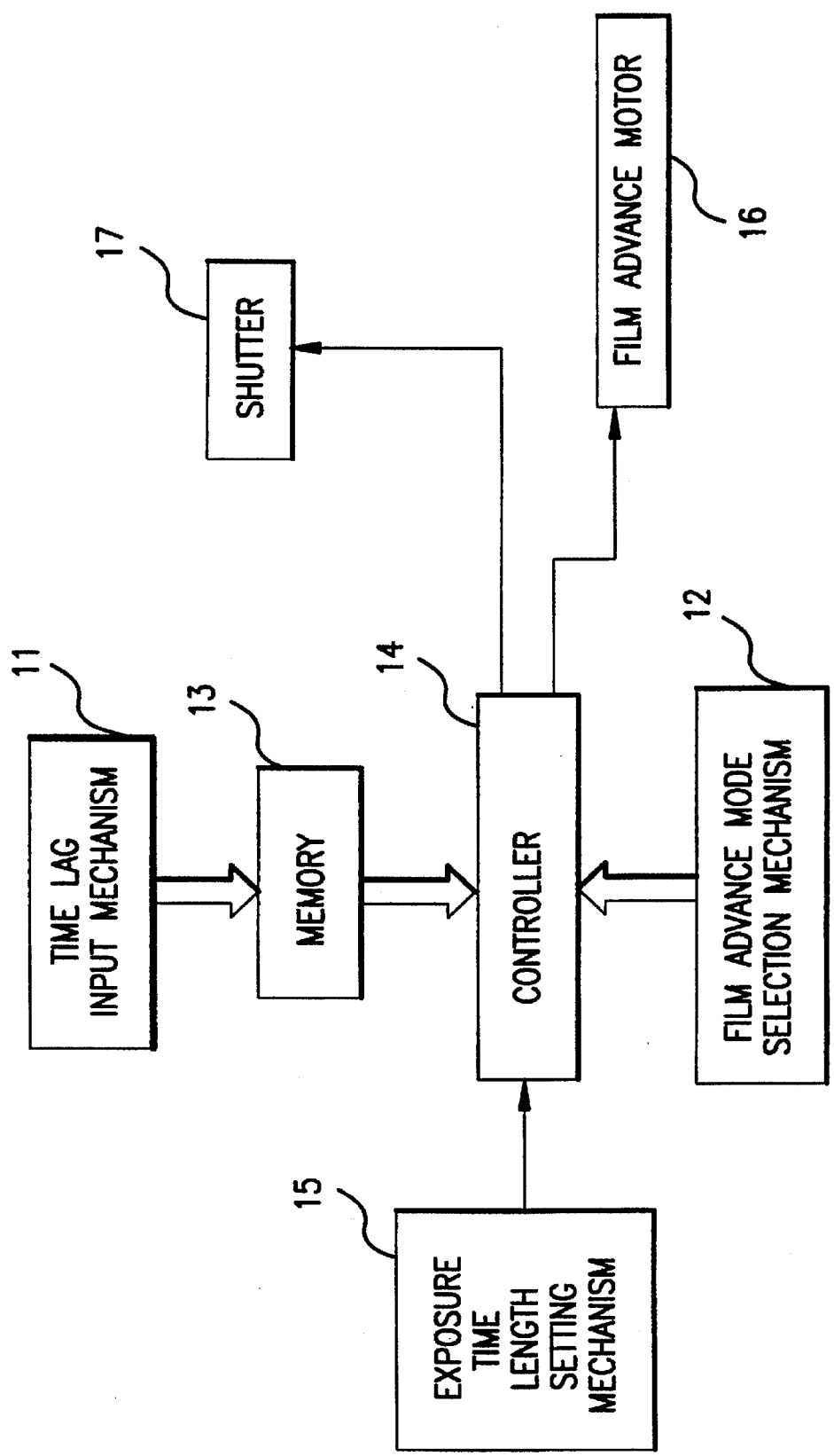
FIG. 1 is a block diagram showing pertinent portions of a variable time lag camera in accordance with an embodiment of the invention.

FIG. 1 is a block diagram showing a variable time lag camera in accordance with an embodiment of the present invention. In FIG. 1, the length of the release time lag set by the photographer is input into memory 13 from time lag input mechanism 11 and then input into controller 14. Controller 14 can be a microprocessor having CPU, ROM, RAM, etc. Also input to controller 14 are the release signal from the release button 8, the signal from the film advance mode selection mechanism 12 for setting the film advance for either single-frame mode or for continuous photography mode for sequentially taking multiple pictures, and the signal setting the length of the film exposure time that comes from the exposure time length setting mechanism 15. The film advance mode selection mechanism 12, the exposure time length setting mechanism 15 and the release button 8, and their operations are well known and need not be explained in any more detail herein.

Controller 14, in response to the signals noted above, controls movement of shutter 17, controls the film exposure time, and controls the film advance motor 16 for advancing the film as is well known.

Figure 2:
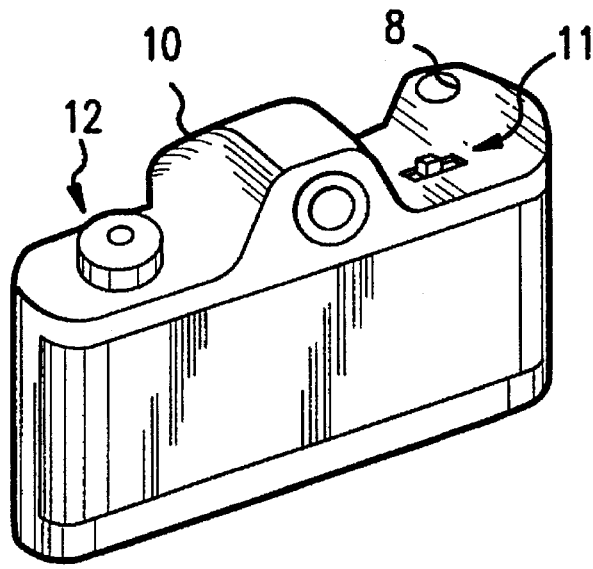
FIG. 2 is a rear perspective view of a variable time lag camera in accordance with an embodiment of the invention.

Time lag input mechanism 11, film advance mode selection mechanism 12, and release button 8 are arranged on the upper surface of camera 10 as shown in FIG. 2.

Figure 3:
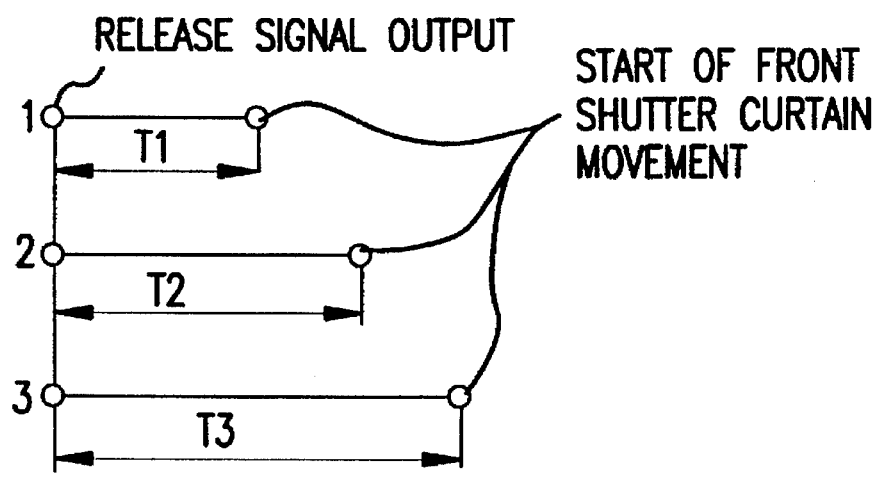
FIG. 3 is a timing chart of a variable time lag camera in accordance with an embodiment of the invention.

Time lag input mechanism 11 includes a selector switch having three positions. When switched to position 1, 2, and 3, respectively, release time lag value $T_1$, $T_2$, and $T_3$, which are shown in FIG. 3, are selected and stored in memory 13. Time lag values $T_1$, $T_2$, and $T_3$ have the following relationship: $T_1<T_2<T_3$. Typically, the time lag values $T_1$, $T_2$, and $T_3$ are predetermined values stored in advance in a memory (not shown) of camera, or can be derived by controller 14 based on differences in the signal (e.g., a voltage signal) output by mechanism 11 when switched between positions 1, 2 and 3. Thus, when the switch is in position 1, memory 13 receives $T_1$, when in position 2, memory 13 receives $T_2$, and when switched to position 3, memory 13 receives $T_3$. The front curtain of shutter 17 starts moving when release time lag value $T_1$, $T_2$, or $T_3$ elapses after the output of the release signal (which occurs when release button 8 is appropriately actuated).

By rotating the film advance mode selection mechanism 12, continuous photography mode "C" or single-frame mode "S" can be selected by the photographer. Information about the selected film advance mode is supplied to controller 14 from film advance mode selection mechanism 12.

Figure 4:
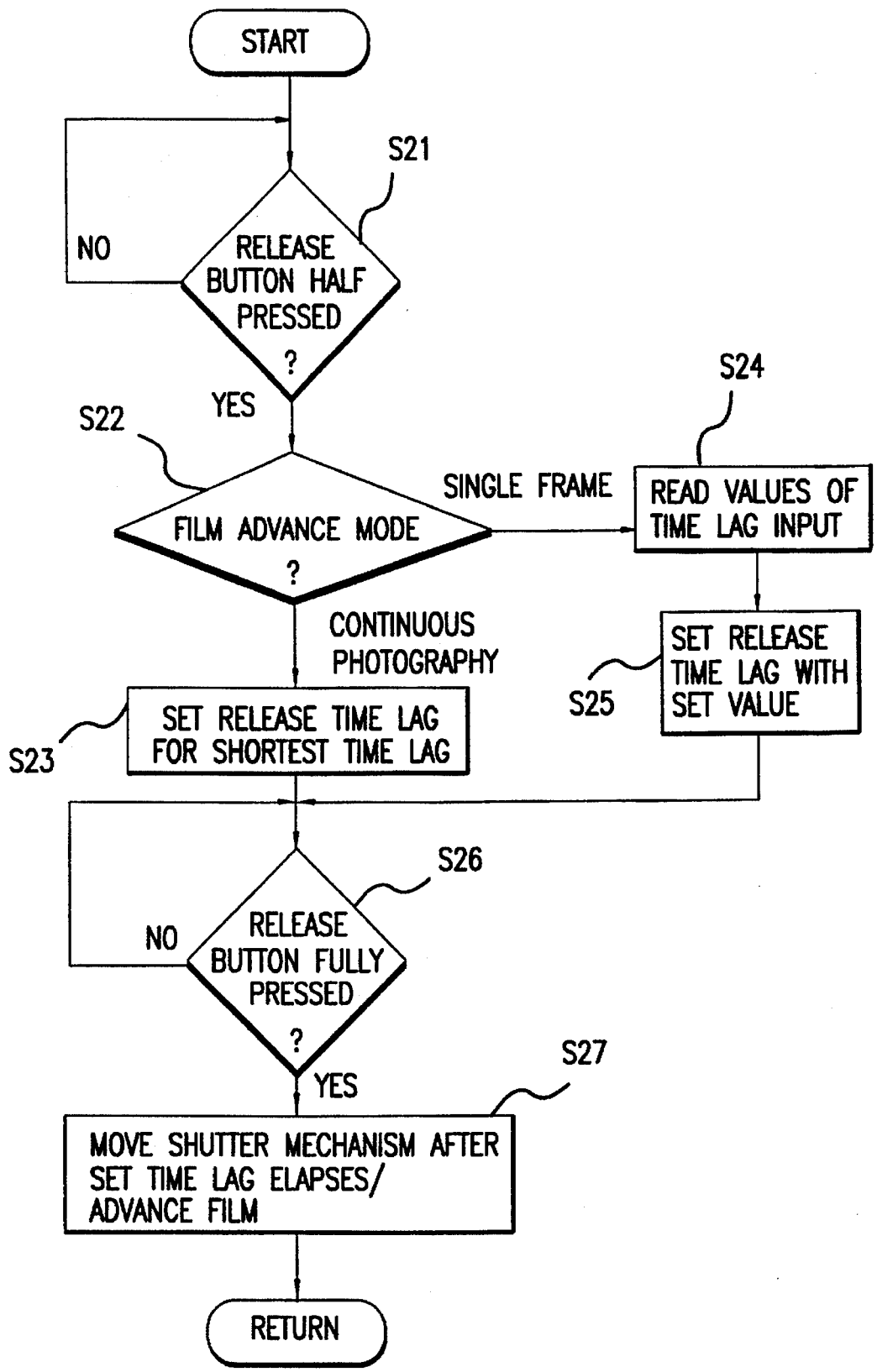
FIG. 4 is a flow chart of a time lag selection routine of a variable time lag camera in accordance with an embodiment of the invention.

Next, the procedure performed by controller 14 to set the release time lag will be explained using the flow chart of FIG. 4.

First, a determination is made in step S21 whether the release button 8 is pressed half-way. If the release button 8 is pressed half-way, flow proceeds to step S22 and a determination is made regarding the film advance mode based on the signal supplied from film advance mode selection mechanism 12. Flow then proceeds to step S23 if the selected film advancing mode is the continuous photography mode or to step S24 if the selected film advancing mode is the single-frame mode. As is well known, in the single-frame mode, film advance motor 16 advances the film by one frame after a photograph is taken, whereas in the continuous photography mode, film advance motor 16 advances the film through plural frames at a high advance rate so that a plurality of photographs can be taken in sequence at a high rate.

In step S23, the release time lag is set for the shortest value $T_1$. Flow then continues to step S26. Alternatively, when flow proceeds to step S24 the value (either $T_1$, $T_2$, or $T_3$) of the time lag input to memory 13 by photographer manipulation of the three-position switch on camera 10 is read from memory 13. Then, in step S25 the selected release time lag is set to the value read from memory 13 (either $T_1$, $T_2$, or $T_3$). Flow then proceeds to step S26.

In step S26, a determination is made whether the release button 8 is pressed fully. If release button 8 is pressed fully, controller 14 receives the release signal. Then, after the release time lag ($T_1$, $T_2$, or $T_3$) elapses, shutter 17 is driven in step S27. Also in step S27, the film is advanced by driving the film advance motor 16 as appropriate based on whether the camera is in the single-frame or in the continuous photography mode.

As explained above, because the variable time lag camera of the subject invention is constructed with a time lag adjusting mechanism that sets the time lag between the generation of the release signal and the start of movement of the shutter mechanism from a plurality of possible time lag values, the shutter mechanism can be started after the camera has stabilized by setting the length of the time lag as the time it takes vibrations from such things as mirror movement to settle. In this manner, the problems caused by camera movement can be prevented.

Also, by enabling the photographer to select from between a plurality of available time lags, the camera can be operated more in accordance with the needs of the photographer and with the requirements of the photographic opportunity. For example, when photographs are being taken of stationary objects, the highest time lag value ($T_3$) can be selected to ensure that the camera has stabilized fully. Alternatively, when photographing action scenes, for example, sporting events, in which only a brief opportunity is available to photograph a particular scene, a shorter time lag such as $T_1$ or $T_2$ can be selected so that there is less likelihood that the particular scene will change (and the photographic opportunity be lost) than when the long release time lag $T_3$ is used. Thus, while the time lags $T_1$ and $T_2$ may not allow camera vibration due to camera mirror movement, for example, to settle down to the fullest possible extent, they are advantageous particularly for fast changing scenes.

Further, because the time lag adjusting mechanism is automatically adjusted so that the time lag between the generation of the release signal and the start of movement of the shutter mechanism is minimized when the continuous photography mode is selected, it is unnecessary to reset the value of the release time lag every time continuous photography is performed and it is possible to automatically utilize the high frame speed advancement rate during the continuous photography mode.

While this invention has been described in conjunction with specific embodiments thereof, it is evident that many alternatives, modifications and variations will be apparent to those skilled in the art. For example, two, four, or more time lags can be made available for selection by the photographer, instead of three time lags as in the illustrated embodiment. Accordingly, the preferred embodiments of the invention as set forth herein are intended to be illustrative, not limiting. Various changes may be made without departing from the spirit and scope of the invention as defined in the following claims.

What is claimed is:

1. A variable time lag camera comprising:
   a user actuatable release signal generation mechanism that generates a release signal when actuated by a user;
   a shutter mechanism that initiates exposure of a recording medium to an image upon receipt of said release signal; and a time lag adjusting mechanism that sets a time lag between the generation of the release signal by said release signal generation mechanism and receipt of said release signal by said shutter mechanism, said time lag adjusting mechanism selectively setting said time lag from a plurality of available time lags, said plurality of available time lags including a maximum time lag that is sufficient to permit stabilization of vibrations caused by movement of an internal movable component of the camera, and a minimum time lag that is not sufficient to permit stabilization of said vibrations, wherein said plurality of available time lags have values in the tens of milliseconds.

2. The variable time lag camera of claim 1, wherein said time lag adjusting mechanism includes:

a user actuatable time lag selection mechanism that enables the user to select a time lag from the plurality of available time lags, said time lag selection mechanism generating a time lag selection signal indicating the user selected time lag; and a controller that is coupled to said release signal generation mechanism, said shutter mechanism, and to said time lag selection mechanism, said controller receiving said release signal from said release signal generation mechanism and forwarding said release signal to said shutter mechanism after the time lag indicated by said time lag selection signal elapses.

3. The variable time lag camera of claim 1, wherein said camera is operable in at least a single-frame mode in which a single photograph is taken for each actuation of said user actuatable release signal generation mechanism, said time lag adjusting mechanism being operable at least during said single-frame mode to enable selection between said plurality of available time lags in said single-frame mode.

4. The variable time lag camera of claim 1, wherein said camera is operable in at least a single-frame mode in which a single photograph is taken for each actuation of said user actuatable release signal generation mechanism, said time lag adjusting mechanism being operable at least during said single-frame mode to enable selection between said plurality of available time lags in said single-frame mode.

5. The variable time lag camera of claim 1, wherein said release signal generation mechanism includes a button that can be depressed by the user and that is located on a surface of the camera.

6. The variable time lag camera of claim 5, wherein said button is located on an upper surface of the camera.

7. The variable time lag camera of claim 1, wherein said time lag adjusting mechanism includes a switch that can be moved by the user and that is located on a surface of the camera.

8. The variable time lag camera of claim 7, wherein said switch is located on an upper surface of the camera.

9. The variable time lag camera of claim 7, wherein said camera surface includes indicia adjacent to said switch, said indicia signifying each of said plurality of available time lags.

10. The variable time lag camera of claim 7, wherein said switch is a slidable switch.

11. The variable time lag camera of claim 10, wherein said slidable switch is slidable between three positions so that said plurality of available time lags comprises three different time lags.

12. The variable time lag camera of claim 1, further comprising:

a film advancing mechanism that selectively advances film in said camera by either a single-frame mode, in which the film is advanced by a single frame, or by a continuous photography mode, in which the film is advanced by a plurality of frames; and a user actuatable advance mode selection mechanism that generates an advance mode signal indicating whether the film advancing mechanism should advance the film in the single-frame mode or in the continuous photography mode;

wherein said time lag adjusting mechanism sets the time lag to be said minimum time lag when the advance mode signal indicates that the continuous mode is selected.

13. The variable time lag camera of claim 12, wherein said time lag adjusting mechanism includes:

a user actuatable time lag selection mechanism that enables the user to select a time lag from the plurality of available time lags, said time lag selection mechanism generating a time lag selection signal indicating the user selected time lag; and a controller that is coupled to said release signal generation mechanism, said shutter mechanism, said time lag selection mechanism, said film advancing mechanism, and to said advance mode selection mechanism, said controller receiving said release signal from said release signal generation mechanism and receiving said advance mode signal from said advance mode selection mechanism, said controller forwarding said release signal to said shutter mechanism after the time lag indicated by said time lag selection signal elapses and causing said film advancing mechanism to advance by a single frame when said advance mode signal indicates that the single-frame mode is selected, said controller forwarding said release signal to said shutter mechanism after the minimum time lag elapses and causing said film advancing mechanism to advance by multiple frames when said advance mode signal indicates that the continuous photography mode is selected.

14. The variable time lag camera of claim 12, wherein said advance mode selection mechanism includes a switch that can be moved by the user and that is located on a surface of the camera.

15. The variable time lag camera of claim 14, wherein said switch is a rotatable switch.

16. The variable time lag camera of claim 15, wherein said release signal generation mechanism includes a button that can be depressed by the user and that is located on said surface of the camera.

17. The variable time lag camera of claim 14, wherein said switch is located on an upper surface of the camera.

18. The variable time lag camera of claim 17, wherein said time lag adjusting mechanism includes a switch that can be moved by the user and that is located on said surface of the camera.

19. The variable time lag camera of claim 18, wherein said switch is a slidable switch.

20. A variable time lag camera comprising:

release signal generation means for generating a release signal;

a shutter mechanism that initiates exposure of a recording medium to an image upon receipt of said release signal; and time lag adjusting means for setting a time lag between the generation of the release signal by said release signal generation means and receipt of said release signal by said shutter mechanism, said time lag adjusting means selectively setting said time lag from a plurality of available time lags, said plurality of available time lags including a maximum time lag that is sufficient to permit stabilization of vibrations caused by movement of an internal movable component of the camera, and a minimum time lag that is not sufficient to permit stabilization of said vibrations, wherein said plurality of available time lags have values in the tens of milliseconds.

21. The variable time lag camera of claim 20, wherein said release signal generation means includes a manually movable selection member that enables the user to initiate generation of said release signal.

22. The variable time lag camera of claim 20, wherein said camera is operable in at least a single-frame mode in which a single photograph is taken for each actuation of said release signal generation means, said time lag adjusting means being operable at least during said single-frame mode to enable selection between said plurality of available time lags in said single-frame mode.

23. The variable time lag camera of claim 20, wherein said camera is operable in at least a single-frame mode in which a single photograph is taken for each actuation of said release signal generation means, said time lag adjusting means being operable at least during said single-frame mode to enable selection between said plurality of available time lags in said single-frame mode.

24. The variable time lag camera of claim 20, further comprising:

film advancing means for selectively advancing film in said camera by either a single-frame mode, in which the film is advanced by a single frame, or by a continuous photography mode, in which the film is advanced by a plurality of frames; and advance mode selection means for generating an advance mode signal indicating whether the film advancing means should advance the film in the single-frame mode or in the continuous photography mode;

wherein said time lag adjusting means sets the time lag to be said minimum time lag when the advance mode signal indicates that the continuous mode is selected.

25. The variable time lag camera of claim 24, wherein said time lag adjusting means includes:

time lag selection means for selecting a time lag from the plurality of available time lags, said time lag selection means generating a time lag selection signal indicating the user selected time lag; and control means, coupled to said release signal generation means, said shutter mechanism, said time lag selection means, said film advancing means, and to said advance mode selection means, said control means for receiving said release signal from said release signal generation means and receiving said advance mode signal from said advance mode selection means, said control means forwarding said release signal to said shutter mechanism after the time lag indicated by said time lag selection signal elapses and causing said film advancing means to advance by a single frame when said advance mode signal indicates that the single-frame mode is selected, said control means forwarding said release signal to said shutter mechanism after the minimum time lag elapses and causing said film advancing means to advance by multiple frames when said advance mode signal indicates that the continuous photography mode is selected.

26. The variable time lag camera of claim 24, wherein said advance mode selection means includes a manually movable selection member that enables the user to select between said single-frame mode and said continuous photography mode.

27. The variable time lag camera of claim 20, wherein said time lag adjusting means includes:

time lag selection means for selecting a time lag from the plurality of available time lags, said time lag selection means generating a time lag selection signal indicating the selected time lag; and control means, coupled to said release signal generation means, said shutter mechanism, and to said time lag selection means, said control means for receiving said release signal from said release signal generation means and forwarding said release signal to said shutter mechanism after the time lag indicated by said time lag selection signal elapses.

28. The variable time lag camera of claim 27, wherein said time lag selection means includes a manually movable selection member that enables the user to select one of said plurality of available time lags.

29. The variable time lag camera of claim 28, wherein said time lag selection means is located on a surface of said camera, said camera surface including indicia adjacent to said time lag selection means, said indicia signifying each of said plurality of available time lags.

30. A camera in which a controller receives a release signal that indicates the camera user's command to initiate exposure of a recording medium in the camera to an image, the controller forwarding the release signal to a shutter mechanism of the camera after a set time lag from receipt of the release signal elapses, said camera comprising:

a manually operable time lag selection switch that enables the user to set the time lag, said time lag selection switch having a plurality of available time lag settings, said plurality of available time lag settings having different durations ranging from a minimum time lag to a maximum time lag, said maximum time lag being sufficient to permit stabilization of vibrations caused by movement of an internal movable component of the camera, said minimum time lag not being sufficient to permit stabilization of said vibrations, wherein said plurality of available time lags have values in the tens of milliseconds.

31. The camera of claim 30, wherein said camera is operable in at least a single-frame mode in which a single photograph is taken each time said release signal is received, said time lag selection switch being operable at least during said single-frame mode to enable selection between said plurality of available time lags in said single-frame mode.

32. The camera of claim 30, wherein said camera is operable in at least a single-frame mode in which a single photograph is taken each time said release signal is received, said time lag selecting switch being operable at least during said single-frame mode to enable selection between said plurality of available time lags in said single-frame mode.

33. The camera of claim 30, further comprising:

a film advancing mechanism that selectively advances film in said camera by either a single-frame mode, in which the film is advanced by a single frame, or by a continuous photography mode, in which the film is advanced by a plurality of frames; and a manually operable advance mode selection switch that enables the user to select between the single-frame mode and the continuous photography mode;

wherein the controller sets the time lag to be said minimum time lag when the continuous mode is selected with said advance mode selection switch.

34. The camera of claim 33, wherein said controller sets the time lag selected by said time lag selection switch when said single-frame mode is selected.

35. The camera of claim 30, wherein said time lag selection switch is located on an upper surface of the camera.

36. The camera of claim 35 wherein said camera surface includes indicia adjacent to said time lag selection switch, said indicia signifying each of said plurality of available time lags.

37. The camera of claim 35, wherein said time lag selection switch is a slidable switch.

38. The camera of claim 37, wherein said slidable switch is slidable between three positions so that said plurality of available time lag settings comprise three different time lag settings.

39. A variable time lag camera comprising:

a user actuatable release signal generation mechanism that generates a release signal when actuated by a user;

a shutter mechanism that initiates exposure of a recording medium to an image; and a time lag adjusting mechanism that sets a time lag between the generation of the release signal by said release signal generation mechanism and receipt of said release signal by said shutter mechanism, said time lag adjusting mechanism selectively setting said time lag from a plurality of available time lags, said plurality of available time lags having values in the tens of milliseconds;

said camera being operable in at least a single-frame mode in which a single photograph is taken for each actuation of said user actuatable release signal generation mechanism, said time lag adjusting mechanism being operable at least during said single-frame mode to enable selection between said plurality of available time lags in said single-frame mode.

40. A camera in which a controller receives a release signal that indicates the camera user's command to an image, the controller forwarding the release signal to a shutter mechanism of the camera after a set time lag from receipt of the release signal elapses, said camera being operable in at least a single-frame mode in which a single photograph is taken each time said release signal is received, said camera comprising:

a manually operable time lag selection switch that enables the user to set the time lag, said time lag selection switch having a plurality of available time lag settings, said plurality of available time lag settings having different durations ranging from a minimum time lag to a maximum time lag, said minimum time lag and maximum time lag having values in the tens of milliseconds, said manually operable time lag selection switch being operative at least during the single-frame mode to enable selection between said plurality of available time lags when said camera is in said single-frame mode.

* * * * *